(12) United States Patent
Sasabayashi et al.

(10) Patent No.: US 7,501,371 B2
(45) Date of Patent: Mar. 10, 2009

(54) DIELECTRIC CERAMIC, METHOD FOR MANUFACTURING DIELECTRIC CERAMIC, AND MONOLITHIC CERAMIC CAPACITOR

(75) Inventors: Takehisa Sasabayashi, Ritto (JP); Masayuki Ishihara, Yasu (JP); Tomoyuki Nakamura, Moriyama (JP); Harunobu Sano, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 65 days.

(21) Appl. No.: 11/655,132

(22) Filed: Jan. 19, 2007

(65) Prior Publication Data

US 2007/0135295 A1 Jun. 14, 2007

Related U.S. Application Data

(63) Continuation of application No. PCT/JP2006/307830, filed on Apr. 13, 2006.

(30) Foreign Application Priority Data

Apr. 27, 2005 (JP) ............................. 2005-130170

(51) Int. Cl.
*C04B 35/468* (2006.01)
*H01G 4/06* (2006.01)
(52) U.S. Cl. .................... 501/138; 501/139; 361/321.4
(58) Field of Classification Search ................. 501/138, 501/139; 361/321.4
See application file for complete search history.

(56) References Cited

U.S. PATENT DOCUMENTS 5,084,424 A * 1/1992 Abe et al. .................... 501/137
6,556,423 B2 * 4/2003 Konaka et al. ........... 361/321.2

FOREIGN PATENT DOCUMENTS

| EP | 1648004 | * | 4/2006 |
| JP | 2681214 | | 8/1997 |
| JP | 2002-121068 | | 4/2002 |
| JP | 2002-274936 A | | 9/2002 |

OTHER PUBLICATIONS

Machine translation of JP 2002-121068, Apr. 2002.*

* cited by examiner

*Primary Examiner*—Karl E Group
(74) *Attorney, Agent, or Firm*—Dickstein Shapiro LLP (57) ABSTRACT

Dielectric ceramic having a high dielectric constant of 5,500 or more and exhibiting good dielectric constant temperature characteristic, and a small, high-capacitance monolithic ceramic capacitor having an electrostatic capacitance temperature characteristic satisfying the X5R characteristic are provided. The dielectric ceramic includes a $BaTiO_3$ based or $(Ba,Ca)TiO_3$ based primary component, a rare-earth element and Cu, and has a structure composed of crystal grains and grain boundaries between the crystal grains. The ratio of the average concentration of the rare-earth element in the grain boundaries to the average concentration of the rare-earth element in the inside of the crystal grains is less than 2, and in a cross section of the dielectric ceramic, the rare-earth element is present in 90% or more of the region of first crystal grains, the number of which is 55% to 85% of the crystal grains, and the rare-earth element is present in less than 10% of the region of second crystal grains, the number of which is 15% to 45% of the crystal grains.

17 Claims, 3 Drawing Sheets

DIELECTRIC CERAMIC, METHOD FOR MANUFACTURING DIELECTRIC CERAMIC, AND MONOLITHIC CERAMIC CAPACITOR

This is a continuation of PCT/JP2006/307830, filed Apr. 13, 2006.

TECHNICAL FIELD

The present invention relates to dielectric ceramic, a method for manufacturing the dielectric ceramic, and a monolithic ceramic capacitor. In particular, it relates to dielectric ceramic satisfying requirements for a high dielectric constant and good dielectric constant temperature characteristic, a method for manufacturing the dielectric ceramic, and a monolithic ceramic capacitor.

BACKGROUND ART

In general, a monolithic ceramic capacitor, which is a main use of the dielectric ceramic according to an aspect of the present invention, is manufactured in a manner as described below.

Ceramic green sheets containing a dielectric ceramic material are prepared. For example, the dielectric ceramic material to be used contains $BaTiO_3$ or $(Ba,Ca)TiO_3$ as a primary component. An internal electrode is formed on the surface of this ceramic green sheet by applying an electroconductive material with a predetermined pattern.

A plurality of ceramic green sheets including the ceramic green sheets provided with the internal electrodes are laminated and bonded by thermal compression, so that an integrated green ceramic laminate is prepared.

The resulting green ceramic laminate is fired and, thereby, a sintered ceramic laminate is produced. The internal electrodes composed of the above-described electroconductive material are disposed in the inside of this ceramic laminate.

External electrodes are formed on outer surfaces of the ceramic laminate in such a way as to be electrically connected to specific internal electrodes. For example, the external electrodes are formed by applying an electroconductive paste containing an electroconductive metal powder and glass frit on the outer surfaces of the ceramic laminate, followed by baking. In this manner, a monolithic ceramic capacitor is completed.

In recent years, the demand for miniaturization of the monolithic ceramic capacitor has become even more intensified, and the dielectric material to be used therein has been required to have a high dielectric constant. At the same time, the dielectric material must also satisfy a good dielectric constant temperature characteristic and good reliability in a thin layer monolithic ceramic capacitor. Such a dielectric material is disclosed in Patent Document 1.

The dielectric ceramic in Patent Document 1 has a composition containing a primary component represented by a general formula $ABO_3$ and an additional component including a rare-earth element, and has a ceramic structure composed of crystal grains containing the $ABO_3$ as a primary component and grain boundaries between the crystal grains, wherein the distribution of rare-earth element concentration satisfies the condition that the rare-earth element concentration in the grains/the rare-earth element in grain boundaries is ½ or less and satisfies the condition that 20% to 70% of crystal grains have a rare-earth element distribution in which the concentration in the center is at least ⅕₀th of that in the area extending from the surface inward to about 5% of the diameter.

Consequently, it is possible to realize a high dielectric constant, small changes in dielectric constant with temperature and small changes in dielectric constant with time under application of a direct current voltage, a high product (CR product) of insulation resistance and electrostatic capacity, and a long accelerated life of insulation resistance under a high temperature and a high voltage.

Patent Document 1: Japanese Unexamined Patent Application Publication No. 2002-274936 (corresponding to U.S. Pat. No. 6, 556,423)

DISCLOSURE OF INVENTION

Problems to be Solved by the Invention

However, there is a problem in that the dielectric ceramic disclosed in Patent Document 1 has a low dielectric constant of about 3,000.

The present invention has been made to solve the above-described problems. Accordingly, it is an object of the present invention to provide dielectric ceramic having an adequately large dielectric constant, which exhibits a flat temperature characteristic, and a method for manufacturing the dielectric ceramic.

It is also an object of the present invention to provide a small, high-capacitance monolithic ceramic capacitor including the dielectric ceramic according to the present invention and exhibiting a good capacitance temperature characteristic.

Means for Solving the Problems

A dielectric ceramic according to a first aspect of the present invention is characterized by having a composition including a primary component represented by a general formula $ABO_3$ (where A is at least Ba or Ba and Ca and B is Ti, or Ti and Zr and or Hf) and additional components including a rare-earth element and Cu and having a structure composed of crystal grains containing the above-described $ABO_3$ as a primary component and grain boundaries between the crystal grains, wherein when a cross section of the above-described dielectric ceramic is observed, the condition that in 55% to 85% by number of the above-described crystal grains, the above-described rare-earth element is present in 90% or more of the region of each crystal grain and in 15% to 45% by number of the above-described crystal grains, the above-described rare-earth element is present in less than 10% of the region of each crystal grain, and the molar ratio of the average concentration of the rare-earth element in the above-described grain boundaries to the average concentration of the rare-earth element in the regions in which the rare-earth element is present, in the inside of the above-described crystal grains is less than 2.

A dielectric ceramic according to a second aspect of the present invention is characterized in that in the first aspect of the present invention, the molar ratio of the average concentration of the rare-earth element in the above-described grain boundaries to the average concentration of the rare-earth element in the regions in which the rare-earth element is present, in the inside of the above-described crystal grains is 1 or less.

A dielectric ceramic according to a third aspect of the present invention is characterized in that in the first or second aspect of the present invention, the above-described $ABO_3$ is represented by $(Ba_{1-x}Ca_x)_mTiO_3$ (where $0 \leq x \leq 0.03$, $1.001 \leq m \leq 1.012$) and the above-described additional components include a rare-earth element, Mg, Mn, Cu and Si, and with respect to the contents of the above-described additional components relative to 100 parts by mole of the above-described $ABO_3$, the rare-earth element is 0.1 part by mole or more and 1 part by mole or less, Mg is 0.1 part by mole or more and 2 parts by mole or less, Mn is 0.05 part by mole or more and 0.5 parts by mole or less, Cu is 0.1 part by mole or more and 3 parts by mole or less, and Si is 0.2 part by mole or more and 2 parts by mole or less.

A method for manufacturing dielectric ceramic according to an aspect of the present invention is a method for manufacturing the dielectric ceramic according to any one of the first to third aspect and is characterized by including the steps of preparing an $ABO_3$ powder, mixing and heat-treating the above-described $ABO_3$ powder and additional components including a rare-earth element and Cu to produce a modified $ABO_3$ powder in which the above-described rare-earth element has partly formed a solid solution, grinding the above-described modified $ABO_3$ powder to produce a ceramic material powder including particles in which the rare-earth element solid solution region is 90% or more in a grain cross section, and particles, in which the rare-earth element solid solution region is less than 10% in a grain cross section, and firing the above-described ceramic material powder.

A monolithic ceramic capacitor according to an aspect of the present invention is characterized by including a laminate in which a plurality of dielectric ceramic layers are laminated, and internal electrodes are disposed along the interfaces between a plurality of the above-described dielectric ceramic layers, wherein the above-described dielectric ceramic layers are composed of the dielectric ceramic according to any one of the first to third aspects. Advantages According to the first to fourth aspects of the present invention, the crystal grains containing an $ABO_3$ based perovskite compound as a primary component in the dielectric ceramic, are composed of mixed crystals of crystal grains in which the rare-earth element forms a solid solution adequately, and crystal grains in which the solid solution is hardly produced, and a predetermined amount or more of the rare-earth element is present in the crystal grains. Therefore, the dielectric ceramic having a satisfactorily large dielectric constant, a temperature characteristic of which is flat, and a method for manufacturing the dielectric ceramic can be provided.

According to a fifth aspect of the present invention, a monolithic ceramic capacitor having the electrostatic capacitance temperature characteristic satisfying the X5R characteristic of the EIA standard, in spite of its compactness and high capacitance, can be provided by using the dielectric ceramic according to the present invention.

REFERENCE NUMERALS

1: monolithic ceramic capacitor
2: ceramic laminate
3: dielectric ceramic layer
4, 5: internal electrode
8, 9: external electrode
21: crystal grain
21A: crystal grain in which rare-earth element solid solution region is 90% or more in cross section
21B: crystal grain in which rare-earth element solid solution region is less than 10% in cross section
21C: crystal grain in which rare-earth element solid solution region is 10% or more, and less than 90% in cross section
22: grain boundary
30: mixed powder
31: $ABO_3$ particle
32: additional component particle
40: modified $ABO_3$ particle
51: crystal grain in which rare-earth element solid solution region is 90% or more in cross section
52: crystal grain in which rare-earth element solid solution region is less than 10% in cross section
D1: rare-earth element solid solution region
D2: rare-earth element non-solid solution region

BEST MODE FOR CARRYING OUT THE INVENTION

Figure 1:
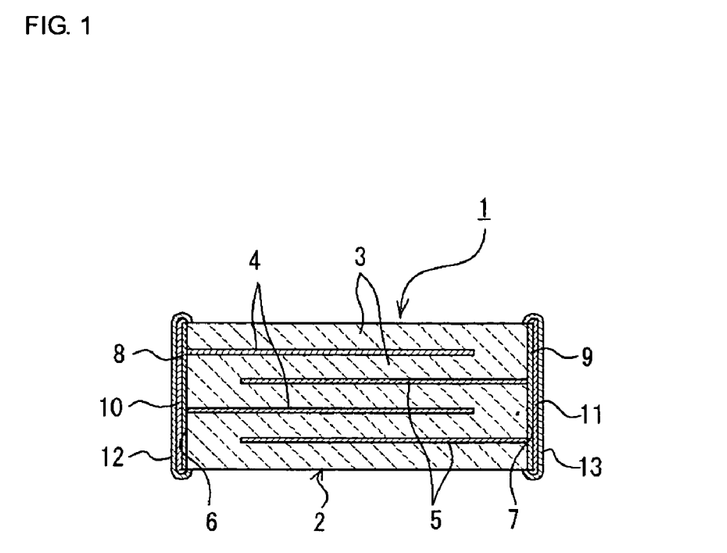
FIG. 1 is a sectional view illustrating a monolithic ceramic capacitor according to an embodiment of the present invention.

An embodiment of a monolithic ceramic capacitor, which is a main use of the dielectric ceramic according to an aspect of the present invention, will be described. FIG. 1 is a sectional view showing a general monolithic ceramic capacitor.

A monolithic ceramic capacitor 1 is provided with a rectangular parallelepiped ceramic laminate 2, as shown in FIG. 1. The ceramic laminate 2 includes a plurality of laminated dielectric ceramic layers 3 and a plurality of internal electrodes 4 and 5 disposed along interfaces between dielectric ceramic layers 3. The internal electrodes 4 and 5 are disposed opposing to each other with a dielectric ceramic layer 3 therebetween in such a way as to achieve an electrostatic capacitance in the ceramic laminate 2. One internal electrode 4 is disposed from the left-side end surface 6 of the ceramic laminate 2 to the vicinity of the right-side end surface 7. The other internal electrode 5 is disposed from the right-side end surface 7 to the vicinity of the left-side end surface 6.

Preferably, an electroconductive material for the internal electrodes 4 and 5 is inexpensive and is nickel or a nickel alloy, copper or a copper alloy, or silver or a silver alloy.

External electrodes 8 and 9 are disposed on the left and right end surfaces 6 and 7, respectively, of the ceramic laminate 2. The external electrode 8 on the left-side end surface 6 is connected to one internal electrode 4, and the external electrode 9 on the right-side end surface 7 is connected to the other internal electrode 5 in such a way that the electrostatic capacitance is get between the upper and lower internal electrodes 4 and 5. The same metal material as in the internal electrodes 4 and 5 can be used as an electroconductive material included in the external electrodes 8 and 9. Furthermore, metal materials, such as silver, palladium, silver-palladium alloys can also be used. The external electrodes 8 and 9 are formed by baking an electroconductive paste produced by adding glass frit to a powder of the above-described metal material.

If necessary, first plating layers 10 and 11 formed from nickel, copper or the like, are disposed on the surface of the external electrodes 8 and 9, respectively, and furthermore, second plating layers 12 and 13 formed from solder, tin or the like, are disposed on the upper surfaces thereof, respectively.

The composition and the crystal structure of the dielectric ceramic according to the present invention will be described below with reference to FIG. 2 and FIG. 3 as well.

The dielectric ceramic according to the present invention is a composition including a primary component represented by a general formula $ABO_3$ (where A is Ba or Ba and Ca and B is Ti, Zr, and Hf, while Ti is indispensable) and additional components including a rare-earth element and Cu. Examples of preferable primary component include $BaTiO_3$ and (Ba, Ca)$TiO_3$. Preferably, the rare-earth element in the additional components include at least one element selected from La, Ce, Pr, Nd, Sm, Eu, Gd, Tb, Dy, Ho, Er, Tm, Yb, Lu and Y.

Figure 2:
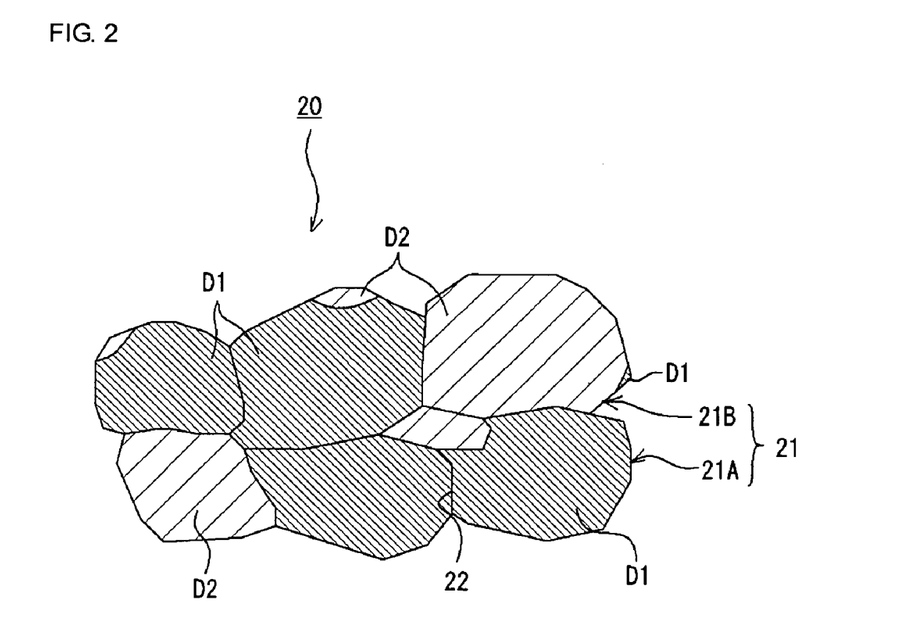
FIG. 2 is a diagram schematically showing a cross section of dielectric ceramic according to the present invention.

As indicated by a schematic diagram shown in FIG. 2, a structure 20 of the dielectric ceramic according to the present invention is composed of crystal grains 21 containing $ABO_3$ as the primary component and grain boundaries 22 between the crystal grains 21. The grain boundary described here includes a triple point as well. A small amount of grains composed of deposits other than the primary component may be present as long as the purpose of the present invention is not impaired.

The crystal grain 21 includes a region in which the rare-earth element has formed a solid solution, and a region in which the rare-earth element has not form a solid solution. Therefore, as shown in FIG. 2, the region in which the rare-earth element has formed a solid solution in the crystal grain 21 is defined as "a rare-earth solid solution region D1" and the region in which the rare-earth element has not form a solid solution is defined as "a rare-earth non-solid solution region D2". Whether a solid solution of the rare-earth element is present in a cross section of the crystal grain 21 or not is determined by using FE-TEM-EDX (transmission electron microscope-energy dispersive X-ray spectroscopy). For the EDX, the prove diameter is 1 nm, and the acceleration voltage is 200 kV. When a rare-earth element is detected under this condition whatever the value, it is assumed that a solid solution of the rare-earth element is present.

The above-described rare-earth element may be present in the grain boundaries 22 besides the solid solution in the crystal grains 21 (the rare-earth element present in the grain boundaries 22 is not shown in the drawing). In this case, the ratio of the average molar concentration of the rare-earth element in the grain boundaries 22 to the average molar concentration in the rare-earth solid solution region D1 is less than 2, and preferably, 1 or less. That is, the rare-earth element must form a predetermined amount of solid solution in the crystal grain.

When a cross section of crystal structure 20 of the above-described dielectric ceramic is observed, the rare-earth solid solution region D1 is 90% or more in each crystal grain (hereafter this crystal grain is defined as "a first crystal grain 21A") in 55% to 85% in number of the crystal grains 21, and the rare-earth solid solution region D1 is less than 10% in each crystal grain (hereafter this crystal grain is defined as "a second crystal grain 21B") in 15% to 45% in number of the crystal grains 21. Although not shown in FIG. 2, a crystal grain in which the rare-earth solid solution region D1 is 10% or more, and less than 90%, is defined as "a third crystal grain". The third crystal grains may be present as long as the range in which the first crystal grains 21A and the second crystal grains 21B satisfy the above-described ratio of the number.

The first crystal grains 21A occupying 55% to 85% in number functions in such a way as to lower the Curie point of the primary component $ABO_3$, for example, $BaTiO_3$, to the vicinity of room temperature and, thereby increase the dielectric constant in the vicinity of room temperature. In this case, it is feared that the dielectric constant in the vicinity of 85° C., which is an upper limit temperature of the X5R characteristic, is lowered and the rate of change in the dielectric constant with temperature is increased in the negative side. However, the second crystal grains 21B occupying 15% to 45% in number functions in such a way as to suppress the reduction of the dielectric constant in the vicinity of 85° C. As a result, the dielectric constant at room temperature can be increased in the crystal structure of the entire dielectric ceramic including the crystal grains 21 and the grain boundaries 22, and, in addition, the dielectric constant temperature characteristic of the entire dielectric ceramic can be flattened.

If the molar ratio of the average concentration of the rare-earth element in the grain boundaries 22 to the average concentration of the rare-earth element in the rare-earth solid solution region D1 is 2 or more, formation of a solid solution of the rare-earth element in the crystal grain 21 does not proceed, and the first crystal grains 21A cannot be produced adequately, so that undesirably, the dielectric constant becomes less than 5,500.

Even when the rare-earth element forms adequate solid solution in the crystal grain 21, the above-described operation and effect cannot be expected in the case where the ratio of the number of the first crystal grains 21A to the second crystal grains 21B falls outside the range of the present invention described below.

That is, in the case where the ratio of the number of the first crystal grains 21A exceeds 85% and the ratio of the number of the second crystal grains 21B is less than 15%, the dielectric constant in the vicinity of 85° C. is lowered due to the first crystal grains 21A and, in addition, the function of the second crystal grains 21B to suppress the reduction of the dielectric constant in the vicinity of 85° C. is degraded, so that the electrostatic capacitance temperature characteristic of the dielectric ceramic cannot satisfy the X5R characteristic. Furthermore, even in the case where the ratio of the number of the first crystal grains 21A satisfies 55% to 85%, the function of the second crystal grains 21B to suppress the reduction of the dielectric constant in the vicinity of 85° C. is degraded similarly if the ratio of the number of the second crystal grains 21B is less than 15%, so that the X5R characteristic cannot be satisfied.

In the case where the ratio of the number of the first crystal grains 21A is less than 55% and the ratio of the number of the second crystal grains 21B exceeds 45%, the effect of increasing the dielectric constant due to the first crystal grains 21A is decreased, and the dielectric constant becomes less than 5,500. Likewise, in the case where the ratio of the number of the first crystal grains 21A is less than 55%, the dielectric constant becomes less than 5,500 even when the ratio of the number of the second crystal grains 21B satisfies 15% to 45%.

Figure 3:
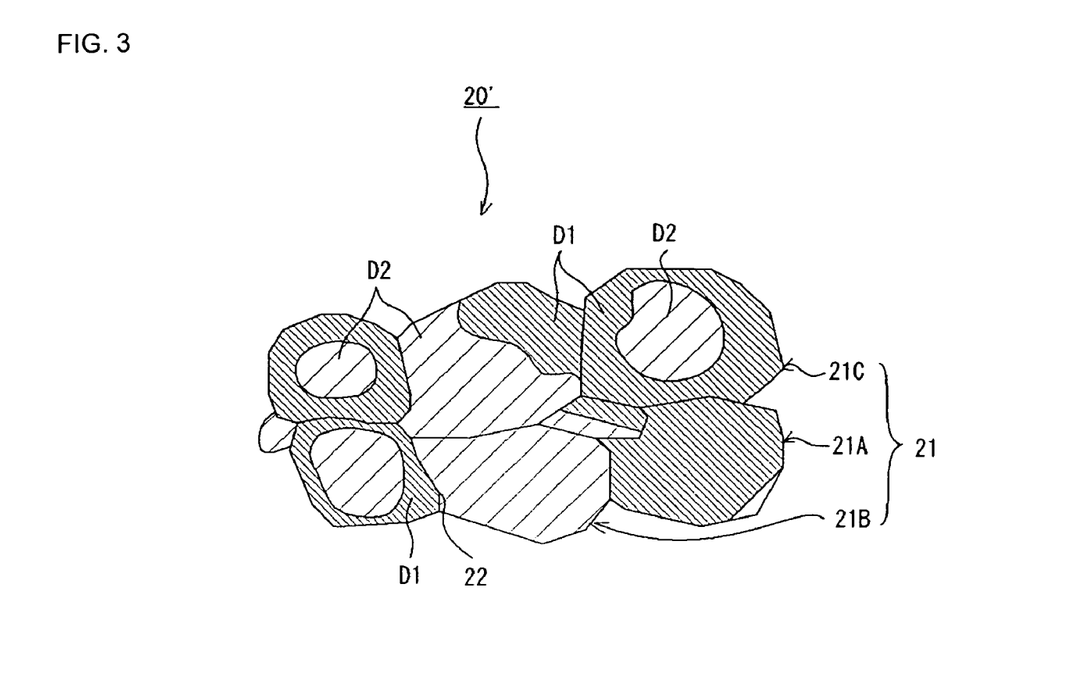
FIG. 3 is a diagram schematically showing a cross section of dielectric ceramic in a comparative example of the present invention.

Furthermore, as indicated by the sectional view shown in FIG. 3, in the case where the ratio of the number of the first crystal grains 21A constituting the crystal structure 20' is less than 55% and the ratio of the number of the second crystal grains 21B is less than 15%, the ratio of the number of the third crystal grains 21C, in which the rare-earth solid solution region D1 is more than 10%, and less than 90%, is increased. In this case as well, the dielectric constant becomes less than 5,500.

The additional component, Cu, has the function of facilitating formation of solid solution of the rare-earth element with the $ABO_3$ particle and stabilizing the rare-earth element in the above-described solid solution form. If Cu is not included in the additional components, the formation of solid solution of the rare-earth element in the crystal grain 21 does not proceed, the molar ratio of the average concentration of the rare-earth element in the grain boundaries 22 to the average concentration of the rare-earth element in the crystal grains 21 becomes 2 or more, and the dielectric constant becomes less than 5,500. The position of presence of Cu in the dielectric ceramic according to the present invention may be either in the crystal grain 21 or in the grain boundary 22, and is not specifically limited.

A more preferable embodiment of a composition of the dielectric ceramic according to the present invention will be described below. In a more preferable dielectric ceramic, the primary component, $ABO_3$, is $(Ba_{1-x}Ca_x)_mTiO_3$ (where $0 \leq x \leq 0.03$, $1.001 \leq m \leq 1.012$), and it is preferable that the additional components relative to the above-described primary component include a rare-earth element, Mg, Mn, Cu and Si. With respect to the contents of the additional components relative to 100 parts by mole of the primary component, preferably, the rare-earth element is 0.1 part by mole or more and 1 part by mole or less, Mg is 0.1 part by mole or more and 2 parts by mole or less, Mn is 0.05 part by mole or more and 0.5 parts by mole or less, Cu is 0.1 part by mole or more and 3 parts by mole or less, and Si is 0.2 part by mole or more and 2 parts by mole or less.

The dielectric ceramic of the present embodiment satisfies the above-described composition and, thereby has a dielectric constant of 5,500 or more and satisfies the X5R characteristic. Furthermore, reliability is improved. That is, the CR product becomes 2,500 ΩF. or more at 125° C. under application of a direct current electric field of 4 kV/mm, and the number of defectives after a lapse of 2,000 hours in a high-temperature load life test at 125° C. under application of a direct current electric field of 8 kV/mm can become 0/100.

In the case where the values of the above-described x and m and the contents of the rare-earth element, Mg, Mn, Cu and Si fall outside the above-described preferable ranges, undesirably, the number of defectives after a lapse of 2,000 hours in a high-temperature load life test becomes 1/100 or more. However, the number of defectives after a lapse of 1,000 hours is 0/100 and, therefore, it is not a significant problem from a practical standpoint.

The firing temperature of the dielectric ceramic of the present embodiment can be lowered by a sintering promoter containing Si. The sintering promoter is not specifically limited as long as Si is contained, and various sintering promoters can be applied. For example, the sintering promoter is allowed to contain Li, B, Al, Zr, Ti, an alkali metal element or an alkaline earth metal element in addition to Si. This sintering promoter may be added in the form of glass.

Furthermore, the dielectric ceramic of the present embodiment may contain various impurities as long as the purpose of the present invention is not impaired. Examples of the above-described impurities include Al, Sr, Zr, Fe, Hf, Na, Co, W, Mo, V, Ni, Zn, Na, Ag, Pd and Cr. When Hf or Zr is contained in the primary component, $ABO_3$, it is not treated as an impurity.

Figure 4:
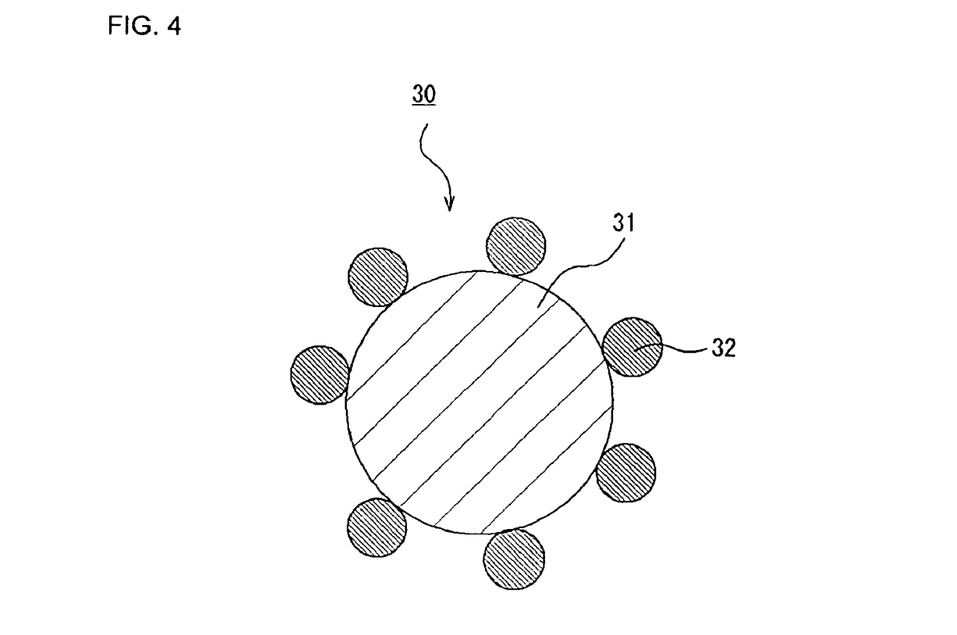
FIG. 4 is a schematic diagram of an embodiment in a method for manufacturing dielectric ceramic according to the present invention, and is a diagram showing the state in which additional component grains are adhered to the $ABO_3$ powder grain.

An embodiment of a method for manufacturing the dielectric ceramic according to the present invention will be described below with reference to schematic diagrams shown in FIG. 4 to FIG. 6.

An $ABO_3$ powder as the primary component and an additional component powder containing a rare-earth element and Cu are prepared. Hereafter, for convenience in explanation, the powder is assumed to be a particle. As schematically shown in FIG. 4, the $ABO_3$ particle 31 and particles 32 of the additional components containing the rare-earth element and Cu are mixed and, thereby, a mixed powder 30, in which the particles 32 of the additional components are adequately dispersed relative to the $ABO_3$ particle 31, is produced. For example, a powder of $BaTiO_3$ or $(Ba,Ca)TiO_3$ can be used as the $ABO_3$ powder which is the primary component. The powders of $BaTiO_3$ and $(Ba,Ca)TiO_3$ can be produced by a method in which raw material powders, $BaCO_3$, $CaCO_3$ and $TiO_3$ are wet-ground, mixed, and calcined, that is, a known solid phase method. Alternatively, these $ABO_3$ powders can also be produced by using a wet synthesis method, e.g., a hydrothermal synthesis method, a hydrolysis method, or an oxalic acid method.

Figure 5:
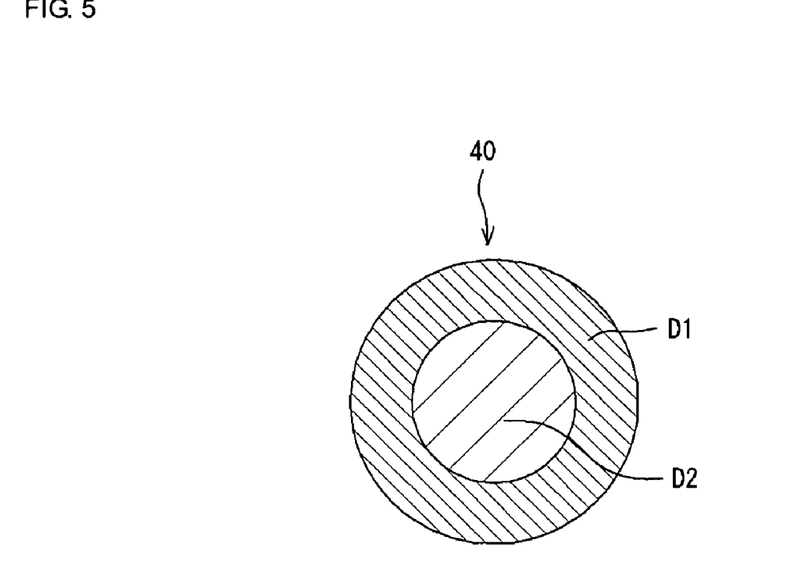
FIG. 5 is a schematic diagram of an embodiment in a method for manufacturing dielectric ceramic according to the present invention, and is a diagram showing the state in which a rare-earth element has formed a solid solution with an $ABO_3$ particle.

The mixed powder 30 is heat-treated at a predetermined temperature and, thereby, a modified $ABO_3$ particle 40, in which the rare-earth element has partly formed a solid solution with the $ABO_3$ particle 31, can be produced, as schematically shown in FIG. 5. Here, the term partly means that the volume ratio of a region D1, in which the rare-earth element has formed a solid solution, relative to the modified $ABO_3$ powder 40 is not 0%, nor 100%. It refers to that the volume ratio is about 10% to 80%. The volume ratio of the rare-earth element solid solution region D1 can be controlled by adjusting, for example, the calcination temperature. Since the rare-earth element moves from the surface of the $ABO_3$ particle 31 toward the inside, the rare-earth element solid solution region D1 in the modified $ABO_3$ powder 40 becomes a region including the grain surface, and the inside thereof becomes a rare-earth element non-solid solution region D2.

In particular, the Cu added together with the rare-earth element contributes significantly to facilitation of formation of a rare-earth element solid solution. If Cu is not contained in the additional components, and the rare-earth element is allowed to form a solid solution with the $ABO_3$ powder 31 by a method, e.g., a heat treatment condition or the like, it becomes difficult to stably keep the appropriate volume ratio of the rare-earth element solid solution region D1. As a result, the ratio of first particles to second particles cannot be kept appropriate by grinding of the modified $ABO_3$ powder 40 described below, and a desired solid solution form of the rare earth cannot be obtained even in the dielectric ceramic after firing.

Besides the rare-earth element and Cu, which are indispensable elements, the additional components for producing the modified $ABO_3$ powder 40 may contain other additional components, that is, Mg, Mn, Si and the like. Similarly to Cu, Si has a function of facilitating formation of solid solution of the rare-earth element with the $ABO_3$ powder 40, and it is preferable that Si is added in combination with Cu. In the present embodiment, however, it is not specifically limited whether the components other than the rare-earth element, among the additional components, form a solid solution with the $ABO_3$ powder 40.

Figure 6:
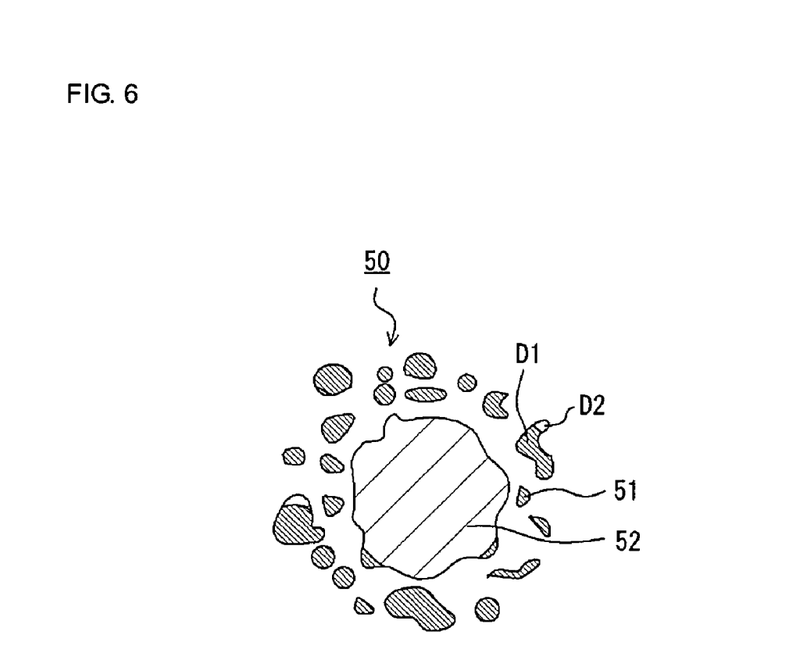
FIG. 6 is a schematic diagram of an embodiment in a method for manufacturing dielectric ceramic according to the present invention, and is a diagram showing the state in which the modified $ABO_3$ particle shown in FIG. 5 has been ground.

The modified $ABO_3$ particle 40 produced as described above is ground by using a mill or the like, so that a ceramic material powder 50 schematically shown in FIG. 6 can be produced. In the grinding of the modified $ABO_3$ particle 40, first, the rare-earth element solid solution region D1 present as the surface layer portion of the modified $ABO_3$ particle 40 is ground and separated, so that a plurality of first particles 51 having 90% or more of rare-earth solid solution region D1 in a grain cross section are produced. The remaining portion, which is a rare-earth element non-solid solution region D2, is ground and separated, so that a second particle 52 having less than 10% of rare-earth solid solution region D1 in a grain cross section is produced mainly.

At this time, if the grinding of the modified $ABO_3$ particle 40 is inadequate, the rare-earth element solid solution region D1 is not satisfactorily ground and separated, and the second particle 52 becomes resistant to forming. On the other hand, if the grinding of the modified $ABO_3$ particle 40 is too strong, even the rare-earth element non-solid solution region D2 is also ground finely, the second particles 52 take on the form having small grain diameters and a large number, and solid solutions with the first particles 51 are formed so as to cause growth of grains during firing. As a result, a second crystal grain 21B, in which the rare-earth element solid solution region is less than 10%, is hardly formed. Therefore, the strength of grinding of the modified $ABO_3$ particle 40 must be adjusted appropriately.

The ceramic material powder 50 can be produced by including these first and second particles 51 and 52 and, if necessary, including appropriate additional components. This ceramic material powder 50 is a mixed powder including the first particles 51 having 90% or more of rare-earth element solid solution region D1 in a grain cross section and the second particle 52 having less than 10% of rare-earth element solid solution region D1 in a grain cross section. This ceramic material powder 50 is fired by a previously known method and, thereby, the crystal structure 20 (refer to FIG. 2) of the dielectric ceramic of the present embodiment can be obtained. At this time, among the first particles 51, a plurality of grains form a solid solution with each other to cause growth of grains, so that the first crystal grains 21A shown in FIG. 2 are formed. On the other hand, the second particles 52 form the second crystal grains 21B shown in FIG. 2 by firing, and the degree of grain growth at that time is small as compared with the grain growth of the first particles 51.

The rare-earth element solid solution form may slightly vary during the firing step. However, the variation can be kept small by selecting an appropriate firing condition.

As described above, one embodiment of the method for manufacturing the dielectric ceramic according to the present invention has been shown. However, the method for manufacturing the dielectric ceramic according to the present invention is not limited to this embodiment.

EXAMPLES

The present invention will be described below with reference to the examples. These examples were carried out in order to provide grounds for determining the scope of the present invention and ascertaining the effects thereof.

Example 1

In the present example, monolithic ceramic capacitors were prepared from ceramic having a specific composition while the existence form of the rare-earth element was changed variously, and the resulting changes in characteristics were evaluated.

A $(Ba_{0.975}Ca_{0.025})_{1.004}TiO_3$ powder synthesized by a solid phase method was prepared as a primary component powder ($ABO_3$ powder) 31. A $Dy_2O_3$ powder, a CuO powder and a $SiO_2$ powder were added to the $ABO_3$ powder 31 in such a way that Dy was 0.6 part by mole, Cu was 1.0 part by mole, and Si was 1.5 parts by mole relative to 100 parts by mole of the primary component. Mixing was performed in water for 24 hours by using partially stabilized zirconium media having a diameter of 2 mm and, thereafter, drying was performed, so that a mixed powder 30 was produced.

The resulting mixed powder 30 was heat-treated at a temperature shown in Table 1, so that a modified $ABO_3$ powder 40, in which Dy formed a solid solution with the $ABO_3$ powder 31, was produced.

A slurry was produced by adding MgO and MnO to the resulting modified $ABO_3$ powder 40 in such a way that Mg was 1.0 part by mole and Mn was 0.15 part by mole relative to 100 parts by mole of the primary component, and performing grinding in an organic solvent for a time shown in Table 1. For the conditions of the mixing and grinding, a ball mill including a cylindrical poly pot having a volume of 1 L was used, the media was 500 g of partially stabilized zirconium balls having a diameter of 2 mm, the amount of the modified $ABO_3$ powder 40 was 100 g, and the organic solvent was ethanol.

A polyvinyl butyral based binder was added to the slurry, followed by mixing. The resulting slurry was sheet-molded by a doctor blade method, so that ceramic green sheets were produced.

An electroconductive paste containing Ni as a primary component was screen-printed on the surfaces of the above-described ceramic green sheets so as to form electroconductive paste layers for constituting internal electrodes, followed by drying. The resulting ceramic green sheets provided with the electroconductive paste layers were laminated in such a way that the lead sides of the electroconductive paste layers become in a staggered configuration and, thereby, a green ceramic laminate was produced.

The resulting green ceramic laminate was heated in a nitrogen atmosphere at 350° C. to burn off the binder. Thereafter, the green ceramic laminate was fired by being kept at a temperature of 1,200° C. for 2 hours in a reducing atmosphere composed of a $H_2$-$N_2$-$H_2O$ gas having an oxygen partial pressure of $10^{-10}$ MPa, so that a ceramic laminate 2 was produced.

An electroconductive paste including B—Li—Si—Ba—O based glass frit and containing Cu as a primary component was applied to both end surfaces of the ceramic laminate 2, and was baked in a nitrogen atmosphere at 800° C., so that external electrodes 8 and 9 electrically connected to the internal electrodes 4 and 5 were formed. Furthermore, in order to improve the solderability, Ni plating layers 10 and 11 and Sn plating layers 12 and 13 were formed on the external electrodes 8 and 9.

With respect to the outer dimensions of the thus produced monolithic ceramic capacitor 1, the length was 3.2 mm, the width was 1.6 mm, the thickness was 1.0 mm, the thickness of the ceramic layer 3 interposed between the internal electrodes 4 and 5 was 1.4 μm, the number of ceramic layers effective at the electrostatic capacitance was 50, and the counter electrode area per ceramic layer was 3.2 $mm^2$. In this manner, evaluation samples of Sample Nos. 1 to 42 were produced.

When a sample was evaluated, the evaluation sample was cut, and a cross section of the dielectric ceramic was observed. Twenty crystal grains 21 were taken from the cross section, and furthermore, at 20 points in each crystal grain 21, the presence or absence of the rare-earth element was measured by FE-TEM-EDX using prove diameter of 1 nm and an acceleration voltage of 200 kV. Rare-earth element solid solution regions D1 and rare-earth element solid solution regions D2 were identified based on this analysis. Individual 20 crystal grains 21 were classified into a second crystal grain 21B in which the rare-earth solid solution region D1 was less than 10%, a third crystal grain 21C in which the region D1 was 10% or more but less than 90%, or a first crystal grain 21A in which the region D1 was 90% or more. The result of ratios of the numbers are shown in Table 1. The concentration of the rare-earth element was measured at 10 arbitrary points in the grain boundaries 22, and the average value thereof was determined. The resulting ratio of this average value and the average value of concentration of the rare-earth element in the rare-earth solid solution regions D1 in the above-described 20 crystal grains 21 is shown in Table 1.

The dielectric constant ε and the dielectric loss tanδ of the Sample Nos. 1 to 42 were evaluated at 25° C. under an alternating current electric field of 1 kHz and 1 Vrms. The rate of change in electrostatic capacitance with reference to the electrostatic capacitance at 25° C. was measured in a temperature range of −55° C. to 85° C. as an index of the dielectric constant temperature characteristic, and the maximum value of the rate of change in this temperature range was determined. Furthermore, the insulation resistance at 125° C. under application of a direct current voltage of 5.6 V for 60 seconds was measured, and the CR product was determined. A high-temperature load life test (125° C., a direct current voltage of 11.2 V, number of samples of 100) was performed, and the number of samples which exhibited an insulation resistance value of 200 kΩ or less after a lapse of 1,000 hours or 2,000 hours was counted as the number of defectives. The results thereof are shown in Table 2. Asterisked sample numbers indicate samples which are outside the scope of the present invention.

TABLE 1

| Sample No. | Heat treatment temperature (° C.) | Slurry grinding time (minute) | Abundance ratio of rare-earth element grain boundary/in grain | Ratio of the number of first crystal grains 21A (%) | Ratio of the number of second crystal grains 21B (%) | Ratio of the number of third crystal grains 21C (%) |
|---|---|---|---|---|---|---|
| 1* | 500 | 4 | 6 | 0 | 95 | 5 |
| 2* | 500 | 12 | 6 | 0 | 70 | 30 |
| 3* | 500 | 24 | 5 | 5 | 60 | 35 |
| 4* | 500 | 30 | 3 | 5 | 50 | 45 |
| 5* | 500 | 36 | 2 | 5 | 15 | 80 |
| 6* | 500 | 48 | 1.5 | 70 | 0 | 30 |
| 7* | 500 | 72 | 1.2 | 95 | 0 | 5 |
| 8* | 600 | 4 | 3 | 0 | 10 | 90 |
| 9* | 600 | 12 | 2 | 0 | 40 | 60 |
| 10* | 600 | 24 | 1.5 | 35 | 30 | 35 |
| 11 | 600 | 30 | 1.5 | 55 | 15 | 30 |
| 12* | 600 | 36 | 1.5 | 65 | 10 | 25 |
| 13* | 600 | 48 | 1.2 | 85 | 0 | 15 |
| 14* | 600 | 72 | 1.2 | 95 | 0 | 5 |
| 15* | 700 | 4 | 2 | 0 | 0 | 100 |
| 16* | 700 | 12 | 1.5 | 0 | 50 | 50 |
| 17 | 700 | 24 | 1.5 | 55 | 45 | 0 |
| 18 | 700 | 30 | 1.2 | 65 | 30 | 5 |
| 19 | 700 | 36 | 1.2 | 70 | 25 | 5 |
| 20* | 700 | 48 | 1 | 90 | 0 | 10 |
| 21* | 700 | 72 | 1 | 95 | 0 | 5 |
| 22* | 800 | 4 | 1.5 | 0 | 0 | 100 |
| 23 | 800 | 12 | 1.2 | 65 | 30 | 5 |
| 24 | 800 | 24 | 1.1 | 70 | 30 | 0 |
| 25 | 800 | 30 | 1.1 | 75 | 25 | 0 |
| 26 | 800 | 36 | 0.9 | 80 | 15 | 5 |
| 27* | 800 | 48 | 0.9 | 90 | 0 | 10 |
| 28* | 800 | 72 | 0.9 | 95 | 0 | 5 |
| 29* | 900 | 4 | 1.2 | 0 | 0 | 100 |
| 30* | 900 | 12 | 1 | 55 | 5 | 40 |
| 31 | 900 | 24 | 1 | 65 | 35 | 0 |
| 32 | 900 | 30 | 0.9 | 75 | 25 | 0 |
| 33 | 900 | 36 | 0.9 | 85 | 15 | 0 |
| 34* | 900 | 48 | 0.9 | 85 | 0 | 15 |
| 35* | 900 | 72 | 0.8 | 95 | 0 | 5 |
| 36* | 1000 | 4 | 1.2 | 10 | 5 | 85 |
| 37* | 1000 | 12 | 1 | 20 | 5 | 75 |
| 38* | 1000 | 24 | 1 | 30 | 5 | 65 |
| 39* | 1000 | 30 | 0.9 | 50 | 5 | 45 |
| 40* | 1000 | 36 | 0.9 | 70 | 5 | 25 |
| 41* | 1000 | 48 | 0.8 | 90 | 0 | 10 |
| 42* | 1000 | 72 | 0.8 | 95 | 0 | 5 |

TABLE 2

| Sample No. | $\epsilon$ | tan δ (%) | Maximum value of rate of change in electrostatic capacitance with temperature (%) | CR product (ΩF) | High-temperature load life the number of defectives after 1000 hours | High-temperature load life the number of defectives after 2000 hours |
|---|---|---|---|---|---|---|
| 1* | 2230 | 2.1 | −3.5 | 2610 | 0/100 | 0/100 |
| 2* | 2510 | 2.2 | −5.2 | 2730 | 0/100 | 0/100 |
| 3* | 2830 | 3.2 | −6.1 | 2820 | 0/100 | 0/100 |
| 4* | 3020 | 3.5 | −8.2 | 2910 | 0/100 | 0/100 |
| 5* | 4100 | 5.3 | −9.3 | 2130 | 0/100 | 2/100 |
| 6* | 8520 | 15.9 | −20.8 | 1950 | 3/100 | 8/100 |
| 7* | 10020 | 20.2 | −36.3 | 1670 | 5/100 | 15/100 |
| 8* | 2410 | 2.1 | −5.9 | 2630 | 0/100 | 0/100 |
| 9* | 2850 | 3.1 | −6.3 | 2870 | 0/100 | 0/100 |
| 10* | 3520 | 3.5 | −12.1 | 2950 | 0/100 | 0/100 |
| 11 | 5760 | 7.5 | −10.4 | 3400 | 0/100 | 0/100 |
| 12* | 6210 | 8.2 | −18.2 | 3610 | 0/100 | 0/100 |
| 13* | 9060 | 19.0 | −23.6 | 3700 | 0/100 | 0/100 |
| 14* | 11200 | 21.2 | −35.6 | 3860 | 3/100 | 10/100 |
| 15* | 3250 | 4.8 | −6.4 | 3020 | 0/100 | 0/100 |
| 16* | 4530 | 6.7 | −8.9 | 3120 | 0/100 | 0/100 |
| 17 | 5720 | 7.5 | −9.4 | 3210 | 0/100 | 0/100 |
| 18 | 6130 | 9.5 | −10.8 | 3360 | 0/100 | 0/100 |
| 19 | 6920 | 9.5 | −11.3 | 3520 | 0/100 | 0/100 |
| 20* | 10420 | 19.8 | −29.3 | 3420 | 1/100 | 5/100 |
| 21* | 12500 | 26.5 | −41.0 | 3120 | 6/100 | 15/100 |
| 22* | 3510 | 4.5 | −7.9 | 2860 | 0/100 | 0/100 |
| 23 | 5520 | 7.0 | −10.3 | 3230 | 0/100 | 0/100 |
| 24 | 6120 | 8.7 | −11.0 | 3320 | 0/100 | 0/100 |
| 25 | 6960 | 9.8 | −11.4 | 3410 | 0/100 | 0/100 |
| 26 | 7320 | 11.2 | −12.0 | 3520 | 0/100 | 0/100 |
| 27* | 11240 | 21.3 | −35.2 | 2110 | 7/100 | 32/100 |
| 28* | 12900 | 28.2 | −45.2 | 1520 | 15/100 | 35/100 |
| 29* | 4520 | 6.8 | −13.3 | 3210 | 0/100 | 0/100 |
| 30* | 5820 | 8.0 | −16.2 | 3380 | 0/100 | 0/100 |
| 31 | 6310 | 8.9 | −11.8 | 3460 | 0/100 | 0/100 |
| 32 | 7550 | 12.8 | −12.2 | 3560 | 0/100 | 0/100 |
| 33 | 7920 | 13.7 | −12.6 | 3580 | 0/100 | 0/100 |
| 34* | 12530 | 23.2 | −40.8 | 2110 | 7/100 | 50/100 |
| 35* | 14400 | 29.5 | −57.6 | 1215 | 13/100 | 72/100 |
| 36* | 2500 | 7.2 | −18.3 | 2240 | 1/100 | 3/100 |
| 37* | 2840 | 7.8 | −20.3 | 1950 | 3/100 | 8/100 |
| 38* | 3200 | 9.2 | −28.3 | 1670 | 5/100 | 15/100 |
| 39* | 3860 | 12.5 | −48.5 | 1620 | 10/100 | 61/100 |
| 40* | 12800 | 23.1 | −55.1 | 1510 | 12/100 | 74/100 |
| 41* | 15600 | 26.2 | −62.4 | 920 | 15/100 | 85/100 |
| 42* | 19530 | 28.9 | −78.1 | 350 | 22/100 | 100/100 |

With respect to Sample Nos. 1, 2, 3, 4, 5, 8, 9 and 15, the average concentration of the rare-earth element in the grain boundaries 22 was more than or equal to double the average concentration of the rare-earth element in the rare-earth solid solution regions D1 in the crystal grains 21 and, therefore, a low dielectric constant of less than 5,500 was exhibited.

Likewise, with respect to Sample Nos. 10 and 16, the ratio of the number of first crystal grains 21A was less than 55% and, therefore, a low dielectric constant of less than 5,500 was exhibited.

With respect to Sample Nos. 6, 7, 12, 13, 14, 20, 21, 27, 28, 30, 34, 35, 40, 41 and 42, the ratio of the number of second crystal grains 21B was less than 15% and, therefore, the electrostatic capacitance temperature characteristic did not satisfy the X5R characteristic.

With respect to Sample Nos. 22, 29, 36, 37, 38 and 39, the ratio of the number of first crystal grains 21A was less than 55% and the ratio of the numbers of second crystal grains 21B was less than 15%. Therefore, a low dielectric constant of less than 5,500 was exhibited.

With respect to the samples within the scope of the present invention, the dielectric constant was 5,500 or more, the electrostatic capacitance temperature characteristic satisfied the X5R characteristic, a CR product of 2,500 or more was exhibited, and good high-temperature load characteristic after 2,000 hours was exhibited.

Evaluation samples of compositions not containing Cu in the additional components were also prepared and evaluated. Sample Nos. 43, 44 and 45 were prepared using the same composition and process condition as those of the mixed powder 30 except that Cu was not included, using heat treatment temperatures of 800° C., 900° C., and 1,000° C., respectively, and using aslurry grinding time was 30 hours. The results thereof are shown in Table 3 and Table 4.

TABLE 3

| Sample No. | Heat treatment temperature (°C.) | Slurry grinding time (minute) | Abundance ratio of rare-earth element grain boundary/in grain | Ratio of the number of first crystal grains 21A (%) | Ratio of the number of second crystal grains 21B (%) | Ratio of the number of third crystal grains 21C (%) |
|---|---|---|---|---|---|---|
| 43* | 800 | 30 | 4 | 0 | 55 | 45 |
| 44* | 900 | 30 | 3 | 5 | 50 | 45 |
| 45* | 1000 | 30 | 1 | 90 | 0 | 10 |

TABLE 4

| Sample No. | $\epsilon$ | tan δ (%) | Maximum value of rate of change in electrostatic capacitance with temperature (%) | CR product (ΩF) | High-temperature load life the number of defectives after 1000 hours | High-temperature load life the number of defectives after 2000 hours |
|---|---|---|---|---|---|---|
| 43* | 2910 | 3.3 | −7.5 | 2860 | 0/100 | 0/100 |
| 44* | 3010 | 3.5 | −8.0 | 2900 | 0/100 | 0/100 |
| 45* | 15550 | 25.0 | −60.5 | 960 | 12/100 | 79/100 |

In Sample Nos. 43 and 44, since Cu was not present, Dy did not adequately form a solid solution with the primary component powder during the heat treatment of the mixed powder 30, and in the ceramic after firing, the average concentrations of the rare-earth element in the crystal grain boundaries were more than or equal to the average concentrations of the rare-earth element in the crystal grains. Therefore, the dielectric constants were less than 5,500.

With respect to Sample No. 45, since the heat treatment temperature of the mixed powder was set at a high 1,000° C., Dy was allowed to form a solid solution with the primary component powder. However, the formation of the Dy solid solution proceeded excessively and, thereby, the ratio of the number of the first crystal grains 21A, in which the rare-earth solid solution region was 90% or more, exceeded 85%. Therefore, the electrostatic capacitance temperature characteristic did not satisfy the X5R characteristic.

Example 2

In the present example, the composition of the dielectric ceramic was changed variously, and influences thereof on the various characteristics were checked.

Monolithic ceramic capacitors were prepared in such a way that the dielectric ceramic had the composition shown in Table 5 in the general formula: 100 $(Ba_{1-x}Ca_x)_mTiO_3$+$bReO_n$+$cMgO$+$dMnO$+$eCuO$+$fSiO_2$ (n represents a positive number to keep electrical neutrality). The manufacturing conditions were the same as that in Example 1. The heat treatment temperature of the mixed powder 30 and the slurry grinding condition were the same as those for Sample No. 18 in Example 1. The evaluation items and the evaluation condition were also the same as in Example 1. The resulting solid solution form of the rare-earth element in the cross-sectional observation was the same as in Sample No. 18 in Example 1. The results of various characteristics are shown in Table 6.

TABLE 5

| Sample No. | x | m | b | Type and amount of rare-earth element of b | c | d | e | f |
|---|---|---|---|---|---|---|---|---|
| 101 | 0.025 | 1.006 | 0.9 | Sm: 0.3, Tb: 0.5, Lu: 0.1 | 0.40 | 0.20 | 0.50 | 1.50 |
| 102 | 0.015 | 1.005 | 0.5 | La: 0.3, Yb: 0.1, Lu: 0.1 | 0.60 | 0.15 | 0.50 | 1.00 |
| 103 | 0.025 | 1.010 | 0.6 | Ho: 0.6 | 0.40 | 0.15 | 0.20 | 2.00 |
| 104 | 0.020 | 1.006 | 0.7 | Tb: 0.1 Lu: 0.3, Y: 0.3 | 0.20 | 0.10 | 0.50 | 1.50 |
| 105 | 0.015 | 1.005 | 0.6 | Eu: 05, Dy: 0.1 | 0.50 | 0.20 | 0.60 | 0.80 |
| 106 | 0.020 | 1.001 | 0.5 | Ho: 0.2, Tm: 0.2, Y: 0.1 | 0.80 | 0.20 | 1.50 | 1.50 |
| 107 | 0.015 | 1.003 | 0.3 | Gd: 0.3 | 0.60 | 0.10 | 0.90 | 1.80 |
| 108 | 0.020 | 1.008 | 0.7 | Pr: 0.1, Nd: 0.1, Ho: 0.5 | 1.00 | 0.20 | 0.80 | 1.50 |
| 109 | 0.000 | 1.010 | 0.9 | La: 0.2, Y: 0.7 | 0.10 | 0.10 | 0.50 | 0.80 |
| 110 | 0.010 | 1.001 | 0.3 | Gd: 0.1, Tb: 0.1, Tm: 0.1 | 0.50 | 0.20 | 2.00 | 1.50 |
| 111 | 0.030 | 1.002 | 0.8 | Sm: 0.2, Dy: 0.2, Ho: 0.2, Y: 0.2 | 0.60 | 0.20 | 0.50 | 1.00 |
| 112 | 0.040 | 1.009 | 0.2 | Yb: 0.2 | 0.80 | 0.45 | 2.00 | 0.30 |
| 113 | 0.030 | 0.998 | 0.7 | Eu: 0.1, Er: 0.3, Tm: 0.3 | 0.60 | 0.15 | 0.50 | 0.50 |
| 114 | 0.020 | 1.001 | 0.3 | Dy: 02, Y: 0.1 | 0.80 | 0.30 | 0.50 | 1.00 |
| 115 | 0.025 | 1.012 | 0.7 | Pr: 0.1, Tb: 0.3, Dy: 0.3 | 0.20 | 0.05 | 0.90 | 1.00 |
| 116 | 0.015 | 1.015 | 0.5 | Er: 0.2, Tm: 0.3 | 0.80 | 0.50 | 0.70 | 0.40 |
| 117 | 0.025 | 1.005 | 0.05 | Tm: 0.05 | 1.00 | 0.20 | 0.50 | 1.50 |
| 118 | 0.010 | 1.006 | 0.1 | Tb: 0.1 | 0.60 | 0.10 | 0.50 | 1.80 |
| 119 | 0.025 | 1.005 | 1.0 | Sm: 0.3, Dy: 0.3, Ho: 0.4 | 0.90 | 0.35 | 1.00 | 1.00 |
| 120 | 0.025 | 1.008 | 1.3 | Ce: 0.3, Pr: 0.3, Tb: 0.4, Dy: 0.3 | 0.60 | 0.20 | 0.90 | 1.50 |
| 121 | 0.020 | 1.010 | 0.6 | Ce: 0.1, Gd: 0.2, Dy: 0.3 | 0.00 | 0.10 | 0.10 | 0.50 |
| 122 | 0.025 | 1.005 | 0.7 | Eu: 0.2, Gd: 0.2, Er: 0.3 | 0.10 | 0.20 | 1.00 | 1.50 |
| 123 | 0.022 | 1.008 | 0.6 | La: 0.3, Gd: 0.1, Dy: 0.2 | 2.00 | 0.20 | 1.00 | 0.80 |

TABLE 5-continued

| Sample No. | x | m | b | Type and amount of rare-earth element of b | c | d | e | f |
|---|---|---|---|---|---|---|---|---|
| 124 | 0.010 | 1.006 | 0.5 | Yb: 0.3, Lu: 0.2 | 2.30 | 0.40 | 1.00 | 1.00 |
| 125 | 0.020 | 1.006 | 0.9 | Gd: 0.3, Tm: 0.3, Yb: 0.3 | 0.60 | 0.00 | 0.50 | 0.50 |
| 126 | 0.015 | 1.010 | 0.5 | Sm: 0.2, Tb: 0.2, Dy: 0.1 | 0.60 | 0.05 | 0.50 | 1.50 |
| 127 | 0.020 | 1.001 | 0.5 | Pr: 0.1, Gd: 0.4 | 0.30 | 0.50 | 0.10 | 1.50 |
| 128 | 0.020 | 1.006 | 0.2 | Pr: 0.2 | 0.80 | 0.70 | 1.50 | 0.40 |
| 129 | 0.010 | 1.003 | 0.5 | Sm: 0.5 | 0.60 | 0.20 | 0.00 | 1.50 |
| 130 | 0.020 | 1.010 | 0.1 | Sm: 0.05, Dy: 0.05 | 0.80 | 0.20 | 0.10 | 1.00 |
| 131 | 0.020 | 1.005 | 0.3 | Er: 0.3 | 0.90 | 0.30 | 3.00 | 0.50 |
| 132 | 0.025 | 1.006 | 1.0 | Sm: 0.6, Eu: 0.4 | 0.60 | 0.10 | 3.50 | 1.50 |
| 133 | 0.030 | 1.010 | 0.7 | Eu: 0.1, Gd: 0.1, Tm: 0.5 | 0.30 | 0.30 | 0.60 | 0.10 |
| 134 | 0.020 | 1.006 | 0.6 | Nd: 0.2, Ho: 0.3, Y: 0.1 | 0.70 | 0.40 | 0.60 | 0.20 |
| 135 | 0.015 | 1.008 | 0.4 | Dy: 0.4 | 0.90 | 0.15 | 0.30 | 2.00 |
| 136 | 0.015 | 1.005 | 0.5 | Er: 0.5 | 0.30 | 0.15 | 0.50 | 2.50 |

TABLE 6

| Sample No. | $\epsilon$ | tan δ (%) | Maximum value of rate of change in electrostatic capacitance with temperature (%) | CR product (ΩF) | High-temperature load life the number of defectives after 1000 hours | High-temperature load life the number of defectives after 2000 hours |
|---|---|---|---|---|---|---|
| 101 | 7780 | 10.8 | −12.6 | 3810 | 0/100 | 0/100 |
| 102 | 7170 | 9.6 | −10.6 | 3510 | 0/100 | 0/100 |
| 103 | 7680 | 10.4 | −11.8 | 3760 | 0/100 | 0/100 |
| 104 | 7800 | 10.7 | −11.7 | 3820 | 0/100 | 0/100 |
| 105 | 7250 | 9.8 | −10.8 | 3550 | 0/100 | 0/100 |
| 106 | 6980 | 9.2 | −11.1 | 3420 | 0/100 | 0/100 |
| 107 | 7270 | 9.6 | −10.5 | 3560 | 0/100 | 0/100 |
| 108 | 6710 | 8.9 | −12.1 | 3290 | 0/100 | 0/100 |
| 109 | 7900 | 10.5 | −14.2 | 2500 | 0/100 | 0/100 |
| 110 | 7160 | 9.4 | −10.1 | 3510 | 0/100 | 0/100 |
| 111 | 7430 | 10.2 | −11.9 | 3640 | 0/100 | 0/100 |
| 112 | 7250 | 7.3 | −8.7 | 2860 | 0/100 | 25/100 |
| 113 | 7320 | 10.0 | −11.1 | 3150 | 0/100 | 31/100 |
| 114 | 6670 | 8.7 | −9.8 | 3270 | 0/100 | 0/100 |
| 115 | 7510 | 10.3 | −11.3 | 3680 | 0/100 | 0/100 |
| 116 | 6030 | 7.8 | −10.0 | 2950 | 0/100 | 16/100 |
| 117 | 6330 | 7.9 | −9.3 | 3100 | 0/100 | 14/100 |
| 118 | 7090 | 9.2 | −9.6 | 3470 | 0/100 | 0/100 |
| 119 | 6870 | 9.4 | −12.8 | 3360 | 0/100 | 0/100 |
| 120 | 7820 | 11.0 | −13.5 | 3830 | 0/100 | 11/100 |
| 121 | 7420 | 10.1 | −10.3 | 3800 | 0/100 | 24/100 |
| 122 | 7740 | 10.6 | −11.5 | 3790 | 0/100 | 0/100 |
| 123 | 5720 | 8.4 | −11.1 | 3140 | 0/100 | 0/100 |
| 124 | 5680 | 6.9 | −10.9 | 2890 | 0/100 | 12/100 |
| 125 | 7350 | 10.2 | −12.1 | 3250 | 0/100 | 52/100 |
| 126 | 7260 | 9.7 | −11.1 | 3550 | 0/100 | 0/100 |
| 127 | 7250 | 9.7 | −10.6 | 3550 | 0/100 | 0/100 |
| 128 | 6980 | 6.7 | −8.6 | 2650 | 0/100 | 11/100 |
| 129 | 2910 | 3.3 | −7.5 | 2860 | 0/100 | 0/100 |
| 130 | 6470 | 8.2 | −9.0 | 3170 | 0/100 | 0/100 |
| 131 | 6020 | 7.7 | −9.5 | 2950 | 0/100 | 0/100 |
| 132 | 7420 | 10.3 | −13.2 | 3630 | 0/100 | 12/100 |
| 133 | 7050 | 9.6 | −10.4 | 3450 | 0/100 | 29/100 |
| 134 | 6570 | 8.8 | −10.3 | 3220 | 0/100 | 0/100 |
| 135 | 6900 | 9.0 | −11.2 | 3380 | 0/100 | 0/100 |
| 136 | 7890 | 10.7 | −11.7 | 3860 | 0/100 | 21/100 |

With respect to Sample No. 112 in which x exceeded 0.03, Sample Nos. 113 and 116 in which m is outside the range of $1.001 \leq m \leq 1.012$, Sample Nos. 117 and 120 in which b is outside the range of $0.1 \leq b \leq 1.0$, Sample Nos. 121 and 124 in which c is outside the range of $0.1 \leq c \leq 2.0$, Sample Nos. 125 and 128 in which d is outside the range of $0.05 \leq d \leq 0.5$, Sample No. 132 in which e is outside the range of $0.1 \leq e \leq 3.0$ (except the case where e is 0), and Sample Nos. 133 and 136 in which f is outside the range of $0.2 \leq f \leq 2.0$, the rates of defectives in the high-temperature load life test for 2,000 hours was 1/100 or more. However, the rates of defectives in the test for 1,000 hours were 0/100.

It is more preferable that the above-described x, m, b, c, d, e, and f are in the above-described preferable range and, thereby, the rate of defectives in the high-temperature load life test for 2,000 hours also becomes 0/100. Furthermore, it is more preferable that x is 0.01 or more, and 0.03 or less, because the CR product becomes 3,000 or more.

Example 3

In the present example, monolithic ceramic capacitors were prepared from a dielectric ceramic having a specific composition while various sintering promoters were used, and the influences thereof was checked.

Monolithic ceramic capacitors were prepared under the same manufacturing condition as in Example 2 in such a way that the dielectric ceramic had the same composition as that of Sample No. 102 in Example 2. However, the sintering promoter component containing $SiO_2$ was changed as shown in Table 7. In the sintering promoter, the portion of Si was assumed to be f parts by mole and the other portion was assumed to be g parts by mole relative to 100 parts by mole of the primary component. An oxide powder was used as the additive. The firing temperature was also changed as shown in Table 7. The evaluation items and the evaluation condition were also the same as in Example 2. The resulting solid solution form of the rare-earth element in the cross-sectional observation was the same as in Sample No. 102 in Example 2. The results of various characteristics are shown in Table 8.

As indicated by Sample Nos. 201 to 212, the firing temperature could be lowered by using various sintering promoters containing various components in addition to Si. The dielectric constant, the electrostatic capacitance temperature characteristic, the CR product, and the high-temperature load characteristic were hardly influenced.

Example 4

In the present example, monolithic ceramic capacitors were prepared from a dielectric ceramic having a specific dielectric ceramic composition and including various impurities, and the influence thereof was checked.

Monolithic ceramic capacitors were prepared under the same manufacturing condition as in Example 2 in such a way that the dielectric ceramic had the same composition as that of sample No. 105 in Example 2. However, it was changed in such a way that the impurities, the type and the amount of which are shown in Table 9, were added simultaneously with the addition of MgO and MnO. The impurities were added in the form of oxide powders, and the amounts were on part by mole basis relative to 100 parts by mole of the primary component. The evaluation items and the evaluation condition were also the same as in Example 2. The resulting solid solution form of the rare-earth element in the cross-sectional observation was the same as in Sample No. 105 in Example 2. The results of various characteristics are shown in Table 10.

TABLE 7

| Sample No. | f | g | Component and amount of g | Firing temperature (°C.) |
|---|---|---|---|---|
| 201 | 0.2 | 0.3 | Ti: 0.3 | 1180 |
| 202 | 1.0 | 0.3 | Li: 0.3 | 1160 |
| 203 | 0.4 | 0.8 | Li: 0.4 B: 0.4 | 1140 |
| 204 | 0.2 | 1.8 | Li: 1.0, Na: 0.8 | 1120 |
| 205 | 0.2 | 0.5 | Li: 0.2, Ca: 0.3 | 1160 |
| 206 | 0.7 | 1.8 | B: 0.3, Mg: 1.5 | 1160 |
| 207 | 0.3 | 0.5 | B: 0.1, Zr: 0.4 | 1180 |
| 208 | 0.8 | 0.2 | B: 0.1, Ga: 0.1 | 1180 |
| 209 | 0.6 | 1.0 | B: 0.5, K: 0.5 | 1160 |
| 210 | 1.5 | 0.8 | Mg: 0.6, Ba: 0.2 | 1160 |
| 211 | 1.5 | 0.6 | Ca: 0.3, Al: 0.3 | 1160 |
| 212 | 0.3 | 0.6 | Ba: 0.3, Sr: 0.3 | 1180 |

TABLE 9

| Sample No. | Amount of impurity | Component of impurity |
|---|---|---|
| 301 | 0.91 | Zr: 0.90, Fe: 0.01 |
| 302 | 0.05 | Ni: 0.02, W: 0.03 |
| 303 | 0.08 | Sr: 0.04, Ni: 0.02, Fe: 0.02 |
| 304 | 1.02 | Zr0.01, Ni: 1.00, Ag: 0.01 |
| 305 | 0.05 | Zr: 0.03, Ag: 0.01, Mo: 0.01 |
| 306 | 0.85 | Zr: 0.70, Fe: 0.05, Ta: 0.10 |
| 307 | 0.11 | Zr: 0.05, Cr: 0.02, Fe: 0.04 |
| 308 | 0.40 | Zr: 0.10, Pd: 0.15, Zn: 0.15 |
| 309 | 1.06 | Ni: 0.90, Cr: 0.10, Mo: 0.06 |
| 310 | 0.45 | Zr: 0.11, V: 0.23, Hf: 0.05, Al: 0.06 |

TABLE 8

| Sample No. | ε | tan δ (%) | Maximum value of rate of change in electrostatic capacitance with temperature (%) | CR product (ΩF) | High-temperature load life the number of defectives after 1000 hours | High-temperature load life the number of defectives after 2000 hours |
|---|---|---|---|---|---|---|
| 201 | 7230 | 10.3 | −11.8 | 3330 | 0/100 | 0/100 |
| 202 | 7350 | 10.5 | −12.0 | 3230 | 0/100 | 0/100 |
| 203 | 7330 | 10.5 | −12.0 | 3230 | 0/100 | 0/100 |
| 204 | 7450 | 10.6 | −12.2 | 3250 | 0/100 | 0/100 |
| 205 | 7250 | 10.3 | −11.9 | 3220 | 0/100 | 0/100 |
| 206 | 7520 | 10.7 | −12.3 | 3260 | 0/100 | 0/100 |
| 207 | 7280 | 10.4 | −11.9 | 3420 | 0/100 | 0/100 |
| 208 | 7300 | 10.4 | −11.9 | 3230 | 0/100 | 0/100 |
| 209 | 7390 | 10.5 | −12.1 | 3240 | 0/100 | 0/100 |
| 210 | 7490 | 10.7 | −12.3 | 3250 | 0/100 | 0/100 |
| 211 | 7460 | 10.6 | −12.2 | 3260 | 0/100 | 0/100 |
| 212 | 7290 | 10.4 | −11.9 | 3120 | 0/100 | 0/100 |

TABLE 10

| Sample No. | ε | tan δ (%) | Maximum value of rate of change in electrostatic capacitance with temperature (%) | CR product (ΩF) | High-temperature load life the number of defectives after 1000 hours | High-temperature load life the number of defectives after 2000 hours |
|---|---|---|---|---|---|---|
| 301 | 7460 | 9.9 | −12.3 | 3250 | 0/100 | 0/100 |
| 302 | 7250 | 10.7 | −11.9 | 3220 | 0/100 | 0/100 |
| 303 | 7260 | 9.7 | −11.9 | 3420 | 0/100 | 0/100 |
| 304 | 7490 | 11.0 | −12.3 | 3250 | 0/100 | 0/100 |
| 305 | 7250 | 9.6 | −11.9 | 3120 | 0/100 | 0/100 |
| 306 | 7420 | 10.9 | −12.2 | 3240 | 0/100 | 0/100 |
| 307 | 7270 | 9.7 | −11.9 | 3270 | 0/100 | 0/100 |
| 308 | 7340 | 10.8 | −12.1 | 3210 | 0/100 | 0/100 |
| 309 | 7500 | 10.0 | −12.3 | 3260 | 0/100 | 0/100 |
| 310 | 7150 | 10.8 | −11.1 | 3020 | 0/100 | 0/100 |

The invention claimed is:

1. A dielectric ceramic characterized by having a composition comprising a primary component represented by a general formula $ABO_3$, in which A is Ba or Ba and Ca and B is Ti optionally in combination with at least one of Zr and Hf, and additional components comprising a rare-earth element and Cu and having a structure comprising crystal grains containing the $ABO_3$ primary component and grain boundaries between the crystal grains, wherein when a cross section of the dielectric ceramic is observed, the condition that the rare-earth element is present in 90% or more of the region of each crystal grain in 55% to 85% by number of the crystal grains, and the rare-earth element is present in less than 10% of the region of each crystal grain in 15% to 45% by number of the crystal grains, and the ratio of the average molar concentration of the rare-earth element in the grain boundaries to the average molar concentration of the rare-earth element in the regions in which the rare-earth element is present in the inside of the crystal grains is less than 2, and wherein the $ABO_3$ is represented by $(Ba_{1-x}Ca_x)_mTiO_3$, in which $0 \leq x \leq 0.03$ and $1.001 \leq m \leq 1.012$ and wherein the additional components comprise a rare-earth element, Mg, Mn, Cu and Si, and relative to 100 parts by mole of the $ABO_3$:

the rare-earth element is 0.1 part by mole or more and 1 part by mole or less;

Mg is 0.1 part by mole or more and 2 parts by mole or less;

Mn is 0.05 part by mole or more and 0.5 part by mole or less;

Cu is 0.1 part by mole or more and 3 parts by mole or less; and

Si is 0.2 part by mole or more and 2 parts by mole or less.

2. The dielectric ceramic according to claim 1, characterized in that $0.1 \leq x$.

3. The dielectric ceramic according to claim 2, characterized in that the ratio of the average molar concentration of the rare-earth element in the grain boundaries to the average molar concentration of the rare-earth element in the regions in which the rare-earth element is present in the inside of the crystal grains is 1 or less.

4. The dielectric ceramic according to claim 2, characterized in that the ratio of the average molar concentration of the rare-earth element in the grain boundaries to the average molar concentration of the rare-earth element in the regions in which the rare-earth element is present in the inside of the crystal grains is 0.9 or less.

5. The dielectric ceramic according to claim 2, characterized in the rare-earth element being present in less 90% and more than 10% of the region of each crystal grain in 5 to 30% by number of the crystal grains.

6. The dielectric ceramic according to claim 3, wherein $0.015 \leq x \leq 0.025$ and $1.003 m 1.010$ and wherein relative to 100 parts by mole of the $ABO_3$:

the rare-earth element is 0.2 to 0.9 part by mole;

Mg is 0.2 to 1 part by mole;

Mn is 0.2 to 0.4 part by mole;

Cu is 0.2 to 2 parts by mole; and

Si is 0.4 to 1.8 parts by mole.

7. The dielectric ceramic according to claim 6, wherein the rare-earth element is present in 90% or more of the region of each crystal grain in 56% to 80% by number of the crystal grains, the rare-earth element is present in less than 10% of the region of each crystal grain in 25% to 30% by number of the crystal grains, the rare-earth element is present in more than 10% but less than 90% of the region of each crystal grain in 5% to 30% by number of the crystal grains, and the ratio of the average molar concentration of the rare-earth element in the grain boundaries to the average molar concentration of the rare-earth element in the regions in which the rare-earth element is present in the inside of the crystal grains is 0.9 or less.

8. The dielectric ceramic according to claim 1, wherein $0.015 \leq x \leq 0.025$ and $1.003 \leq m \leq 1.010$ and wherein relative to 100 parts by mole of the $ABO_3$:

the rare-earth element is 0.2 to 0.9 part by mole;

Mg is 0.2 to 1 part by mole;

Mn is 0.2 to 0.4 part by mole;

Cu is 0.2 to 2 parts by mole; and

Si is 0.4 to 1.8 parts by mole.

9. The dielectric ceramic according to claim 8, wherein the rare-earth element is present in 90% or more of the region of each crystal grain in 56% to 80% by number of the crystal grains, the rare-earth element is present in less than 10% of the region of each crystal grain in 25% to 30% by number of the crystal grains, the rare-earth element is present in more than 10% but less than 90% of the region of each crystal grain in 5% to 30% by number of the crystal grains, and the ratio of the average molar concentration of the rare-earth element in the grain boundaries to the average molar concentration of the rare-earth element in the regions in which the rare-earth element is present in the inside of the crystal grains is 0.9 or less.

10. A method for manufacturing the dielectric ceramic according to claim 1, characterized by comprising the steps of:

preparing an $ABO_3$ powder, wherein the $ABO_3$ is represented by $(Ba_{1-x}Ca_x)_m TiO_3$ in which $0 \leq x \leq 0.03$ and $1.001 \leq m \leq 1.012$;

mixing and heat-treating the $ABO_3$ powder and additional components comprising a rare earth element, Cu, Mg, Mn and Si to produce a modified $ABO_3$ powder in which the rare-earth element has partly formed a solid solution;

grinding the modified $ABO_3$ powder to produce a ceramic material powder including particles in which the rare-earth element solid solution region is 90% or more in a grain cross section, and particles in which the rare-earth element solid solution region is less than 10% in a grain cross section; and firing the ceramic material powder in a reducing atmosphere.

11. A monolithic ceramic capacitor characterized by comprising a laminate comprising a plurality of dielectric ceramic layers, and a pair of internal electrodes disposed along different interfaces of pairs of adjacent dielectric ceramic layers, wherein the dielectric ceramic layers comprise a dielectric ceramic according to claim 1.

12. A monolithic ceramic capacitor according to claim 11 having a pair of external electrodes each of which is electrically connected to a different internal electrode, and comprising Ag, Ni or an alloy thereof.

13. A monolithic ceramic capacitor characterized by comprising a laminate comprising a plurality of dielectric ceramic layers, and a pair of internal electrodes disposed along different interfaces of pairs of adjacent dielectric ceramic layers, wherein the dielectric ceramic layers comprise a dielectric ceramic according to claim 3.

14. A monolithic ceramic capacitor according to claim 13 having a pair of external electrodes each of which is electrically connected to a different internal electrode, and comprising Ag, Ni or an alloy thereof.

15. A monolithic ceramic capacitor characterized by comprising a laminate comprising a plurality of dielectric ceramic layers, and a pair of internal electrodes disposed along different interfaces of pairs of adjacent dielectric ceramic layers, wherein the dielectric ceramic layers comprise a dielectric ceramic according to claim 2.

16. A monolithic ceramic capacitor according to claim 15 having a pair of external electrodes each of which is electrically connected to a different internal electrode, and comprising Ag, Ni or an alloy thereof.

17. A monolithic ceramic capacitor characterized by comprising a laminate comprising a plurality of dielectric ceramic layers, and a pair of internal electrodes disposed along different interfaces of pairs of adjacent dielectric ceramic layers, wherein the dielectric ceramic layers comprise a dielectric ceramic according to claim 8.

* * * * *